3,378,373
WATER-INSOLUBLE NITROGENOUS PHOTO-
GRAPHIC PROTEIN HARDENER
Harald von Rintelen, Cologne-Rodenkirchen, Raymund
Pfeiffenschneider, Leverkusen, Paul Fleiter, Opladen,
and Karl-Heinz Britz, Leverkusen, Germany, assignors
to Agfa Aktiengesellschaft, Leverkusen, Germany, a
corporation of Germany
No Drawing. Filed Dec. 27, 1961, Ser. No. 162,562
Claims priority, application Germany, Jan. 18, 1961,
A 36,521
18 Claims. (Cl. 96—111)

This invention relates to new water-insoluble, film-forming products which contain amino groups as well as to a process for the production of said products.

It is among the objects of the present invention to provide new water-insoluble but water-permeable film-forming products being excellently suitable for photographic layers. Thus it is another object of the present invention to provide new binding agents for light-sensitive layers or other photographic layers.

We have found that water-insoluble, nitrogenous products can be obtained by reacting alginic acid esters containing esterified carboxyl groups with nitrogenous compounds which contain at least two amino groups, each with at least one hydrogen atom bonded to nitrogen.

Suitable substances containing at least two primary or secondary amino groups are aliphatic, cycloaliphatic, aromatic, mixed aliphatic-aromatic, heterocyclic diamines and polymeric amines.

From the great number of polyamino compounds suitable as starting material for the products according to the invention we list the following substances: ethylene diamine, trimethylene diamine, tetramethylene-1,4-diamine, 1-amino - 3 - methylaminopropane, 2-(2-hydroxyethyl)-ethylene diamine, bis-(2-aminoethyl)-amine, hexamethylene-1,6-diamine, diethylenetriamine, triethylenetetramine, dipropylenetriamine and other polyethylene polyamines, polyethylene imine, cyclohexylene diamine, guanidine and phenylenediamine.

In particular proteins such as gelatine, casein, albumin can be reacted with alginic acid ester.

Said compounds are characterised by at least one unit of the following general formula

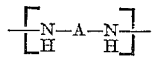

wherein A represents a divalent radical such as alkylene radicals. The methylene chain can be interrupted by heteroatoms such as nitrogen, oxygen or sulphur or furthermore may be substituted. A can also stand for a divalent radical such as cycloalkylene e.g. cyclohexylene, arylene e.g. phenylene, aralkylene or heterocyclic radicals. The free linkages of the nitrogen atoms in the above described general formula can be bonded to other units of the same general formula or by hydrogen, aliphatic, cycloaliphatic, aromatic or araliphatic groups which likewise can be substituted.

Suitable alginic acid esters are derivatives of alginic acid with esterified carboxyl groups. Preferably used are the water-soluble esters which are prepared by reaction of alginic acid with alkylene oxides.

These products are described by H. Maas "Alginsäure and Alginate," SCT-Publ. Co., Heidelberg, 1959, especially pages 126–130. Such esters are for example alginic acid methyl ester prepared by esterification of alginic acid with diazomethane as described in J. Am. Chem. Soc., 62, 1070 (1940). Particularly advantageous are the reaction products of alginic acid with 1.2-epoxides or 1.3-epoxides for example ethylene glycol alginate, trimethylene glycol alginate, propylene glycol alginate prepared from 1.2-propylene oxide and alginic acid, butylene glycol alginate prepared from 1.2-butylene oxide and alginic acid, isobutylene glycol alginate prepared from 1.2-isobutylene oxide and alginic acid or pentylene glycol alginate prepared from 1.2-pentylene oxide and alginic acid. The last mentioned esters are characterised by alcoholic groupings which are substituted by hydroxy groups; they are described in Ind. Eng. Chem. 43, 2073 (1951). It has been proved that the propylene glycol alginate or alginic acid propylene glycol ester is especially useful.

The alginic acid esters may still contain free carboxyl groups. It is however advantageous to use products with a degree of esterification of higher than 50 percent.

The less water-soluble alginic acid esters are less suitable, particularly for the preparation of products which are to be used as binding agent for photographical layers.

The reaction of the components described above can be effected in a simple manner by reacting the compounds with one another at a pH value above 7 in a liquid medium, advantageously an aqueous medium, the compounds being for example treated with alkalis, such as alkali carbonates or caustic alkalis.

Whereas the solution of the compound containing amino groups in admixture with a water-soluble alginic acid ester can be left standing for a relatively long time in solution at a pH value not higher than approximately 6–7 without any change in the viscosity, the mixture immediately solidifies into a jelly on raising the pH value to higher than 7, advantageously to 8–11, and this jelly can no longer be liquefied, even by raising the temperature. If the mixture of the compound containing amino groups and alginic acid ester in aqueous solution is applied to a support, such as glass, paper or film, and if this layer is dried it is still readily soluble, for example in warm water, and immediately melts off the support. However, if such a layer is subjected to an alkali treatment, for example by immersion in an alkali carbonate or caustic alkali solution the two components react with each other, yielding a layer which certainly swells, but cannot be melted even in hot to boiling water, after the alkali has been washed out.

The quantitative ratio between the compound containing amino groups and alginic acid ester can be varied within wide limits. For example, a gelatine of medium viscosity is made insoluble in hot water after alkali treatment by means of 2–10 percent by weight of alginic acid ester. On the other hand, by addition to an alginic acid ester of 2–15 percent of a compound which contains at least two primary or secondary amino groups per molecule, more especially gelatine, it can also be transformed by an alkali treatment into a compound which is still capable of swelling but is insoluble in water.

It is to be assumed that, in the alkaline pH range, a cross-linking takes place between the alginic acid ester or alginic acid resulting as its saponification product and the compound containing amino groups. However, the reaction according to the invention does not occur if free alginic acid is used instead of the alginic acid ester.

The invention is capable of very many uses. Thus, by using the reaction which has been discovered, filaments or foils can be produced by precipitation of a mixture of alginic acid ester and amino compound.

The process according to the invention has acquired particular importance, however, in the production of photographic layers. Thus, by addition of alginic acid esters to photographic gelatine-silver halide emulsions, it is possible to prepare layers which harden after the processing in alkali baths, for example the conventional developer solution, without additional use of a hardener, so that the materials can be directly dried on a hot drying cylinder. Similarly, the alginic acid esters can be mixed with the gelatine of the baryta layer, a protective layer, an intermediate layer or a backing layer. The photographic materials prepared with these layers can be used both in black-and-white photography and in color photography, since the conventional photographic additives, such as stabilisers, wetting agents, sensitisers, and also diffusion-resisting color couplers, can be added to the layers without impairing the reaction according to the invention.

As well as gelatine and alginic acid ester the layers can also contain other protective colloids which are compatible therewith, such as carboxymethylcellulose or polyvinyl alcohol.

EXAMPLE 1

100 ml. of a 4 percent solution of alginic acid propylene glycol ester are mixed with 10 ml. of a 2 percent hexamethylene-1,6-diamine solution, which has been neutralised with hydrochloric acid. This solution is coated on to a glass plate or any other support and the layer is allowed to dry. The layer is now washed for 30 seconds in a 1.5 percent sodium hydroxide solution. After this treatment, the layer is still capable of swelling in water but is no longer soluble, even in hot water.

EXAMPLE 2

500 g. of barium sulphate are suspended in 900 ml. of a 3 percent alginic acid propylene glycol ester solution and 300 ml. of a 5 percent polyvinyl alcohol solution as well as 25 ml. of a 10 percent, strongly degraded gelatine solution of low viscosity. This suspension can also contain dyestuffs or other substances. It is applied in a thin layer to a paper and the material is dried. The paper thus provided with a white pigment can serve as a support for photographic emulsions, offers a good adhesion to the photographic emulsion, and is not capable of being dissolved in water after the alkaline development.

EXAMPLE 3

100 ml. of a 5 percent alginic acid propylene glycol ester solution are mixed with 5 ml. of an aqueous solution of polyethylene imine (neutralised with sulphuric acid). The solution is applied to a support, dried, and washed for 15 sec. in a 5 percent potassium hydroxide solution. Thereafter the excess alkali is washed out and the layer is dried, the said layer is still capable of swelling but no longer soluble in water.

EXAMPLE 4

A photographic gelatino-silver halide emulsion which is prepared by usual methods and which contains 35 g. of silver bromide and 80 g. of gelatine per litre, has added thereto 11.5 g. of alginic acid propylene glycol ester in 500 ml. of water. This emulsion can contain the usual additives, such as sensitisers, stabilisers, and wetting agents.

The emulsion is applied to a support, for example paper, and dried. The photographic material thus obtained is exposed in the usual way and developed in a developer having the following composition:

G. per litre of water
Anhydrous sodium carbonate _____ 30
Anhydrous sodium sulphite _____ 60
Hydroquinone _____ 6
p-Methylaminophenol _____ 1.5
Potassium bromide _____ 1

After a development time of 90 seconds, the photographic paper is briefly washed in a 2 percent acetic acid solution, and thereafter is fixed and rinsed in the usual way. The photographic image thus treated can be dried on a heated drying cylinder, although the melting point of the layer in water was 38° C. prior to the processing.

EXAMPLE 5

A silver bromide emulsion, as mentioned in Example 4, but which has been cast without adding alginic acid propylene glycol ester, and to which no hardening agent has been added or only a quantity of hardening agent which is inadequate for sufficient hardening (for example 0.1–0.25 g. of $CH_2O$ per kg. of emulsion) is coated with the following solution as a protective layer: 10 g. of alginic acid propylene glycol ester, 1.5 g. of a gelatine of high viscosity (6 cp. in 2 percent solution) dissolved in 1 litre of water.

This material is processed as in Example 4, and can thereafter also be subjected to hot drying.

EXAMPLE 6

A photographic material, as described in Example 5, is coated with the following solution as a protective layer: 0.8 g. of alginic acid propylene glycol ester, dissolved in 1 litre of water; the pH value of the solution is 5.3.

This material is processed as described in Example 4 and can thereafter also be subjected to a hot drying operation, since the layer of alginic acid ester in contact with the light-sensitive gelatin emulsion layer causes hardening of the last mentioned layer.

EXAMPLE 7

Preparation of a transfer layer to be used for the silver salt diffusion process.

500 ml. of a 2 percent solution of alginic acid propylene glycol ester having a degree of esterification of 58 percent of the carboxyl groups—the product Algitex 768 (tradename of the firm Henkel & Cie., Dusseldorf)—are adjusted to a pH value of 5.4. To this solution is added a mixture of 1.5 g. of gelatine and 0.05 g. of colloidal silver sulfide capable of acting as development nuclei in 10 ml. of water. If necessary, further ingredients such as wetting agents e.g. saponin or optical brightening agents e.g. Tinopal (tradename of the firm Geigy A.G.) may be incorporated. This solution is cast on a support preferably paper.

The resulting material is suitable as positive paper for the silver salt diffusion process. According to common practice this positive material is conducted in contact with an exposed negative material through a development apparatus being filled with the following developer:

Water _____l__ 1
Sodium sulfite sicc. _____g__ 100
Metol _____g__ 2.5
Hydroquinone _____g__ 15
Caustic soda _____g__ 10
Potassium bromide _____g__ 2
Sodium thiosulfate solid _____g__ 10

The positive copy can be washed and hot dried by means of a suitable drying press.

EXAMPLE 8

Preparation of a photographic intermediate layer

In the case of photographic multi layer materials such as color films it is often advantageous to separate vicinal layers by intermediate layers. On utilizing the process according to the invention one may proceed in the following manner:

A 1.5 percent solution of alginic acid propylene glycol ester having a degree of esterification of 67 percent of the carboxyl groups—Manucolester of the Alginate Industry Ltd.—are adjusted to a pH value of 5.9. Other ingredients such as filter- or screen dyestuffs or wetting agents may be added according to the special requirements. This solution can be cast without adding gelatine. Since reaction occurs with the gelatine layers being in contact to said intermediate layers, the adhesion to the vicinal gelatine layers is excellent. Sodium alginate layers do not adhere to gelatine layers.

EXAMPLE 9

70 parts by weight of alginic acid propylene glycol ester in the form of a 2 percent aqueous solution are mixed with a neutral aqueous solution (10 percent) of 30 parts by weight of casein.

The mixture is cast on a paper support and the material is dried. After treatment with a 1 percent aqueous solution of potassium hydroxide, the layer is still capable of swelling in water but is no longer soluble even in hot water.

It will be clear to those skilled in this art that the invention lends itself to a number of useful modifications in method, materials and utilization. For example the water-insoluble polymers according to the invention may be used as binding agent for any photographical layers including non-light-sensitive layers. Said layers can be used for color or black-and-white photographic films or copying materials or for photographic papers which are to be used with the silver salt diffusion process.

What is claimed is:

1. A method of hardening a photographic protein comprising contacting said protein with a water soluble hydroxy alkyl ester of alginic acid while maintaining the protein and water soluble ester at a pH below 7 and while the protein and water soluble ester are in contact raising the pH above 7 to effect hardening.

2. A method according to claim 1 wherein the protein is selected from the group consisting of gelatin, casein and albumin.

3. A method according to claim 1 wherein the alginic acid is esterified in an amount of at least 50 percent.

4. A method according to claim 1 wherein the water soluble hydroxy alkyl ester of alginic acid is a glycol ester of alginic acid.

5. A method according to claim 1 wherein the protein is gelatin.

6. The method according to claim 5 wherein the water soluble hydroxy alkyl ester of alginic acid is the propylene glycol ester of alginic acid.

7. The method according to claim 1 wherein the pH of the layer is raised above 7 to effect hardening by treatment with an alkaline photographic developer solution.

8. A method of hardening a photographic protein layer comprising mixing at a pH value less than 7 a water soluble hydroxy alkyl ester of alginic acid with an aqueous casting solution for the photographic protein layer, casting the mixture onto a support while maintaining the pH below 7, drying the cast layer and raising the pH of the dried layer to a value of at least 7 thereby hardening the layer.

9. A method according to claim 8 wherein the protein is gelatin and the water soluble hydroxy alkyl ester of alginic acid is the propylene glycol ester of alginic acid.

10. A protographic gelatino-silver halide emulsion in which the gelatin is unhardened and contains a concentration of water soluble hydroxy alkyl ester of alginic acid in an amount sufficient to harden the gelatin upon subjecting the emulsion to a pH above 7.

11. The emulsion of claim 10 wherein the water soluble hydroxy alkyl ester of alginic acid is the propylene glycol ester of alginic acid.

12. A photographic gelatino-silver halide emulsion having incorporated therein a water soluble alkylene glycol ester of alginic acid.

13. A method of hardening a protein comprising homogeneously mixing said protein with a water-soluble hydroxyalkyl ester of alginic acid while maintaining the mixture at a pH below 7 to keep it water-soluble and then raising the pH of the mixture to above 7 to cause the protein to become hardened and insoluble in water.

14. A homogeneous mixture of a protein with a water-soluble hydroxyalkyl ester of alginic acid, in which the protein is from about 2 to about 98% of the mixture.

15. The composition of claim 14 in which the mixture is dispersed in water.

16. The composition of claim 15 in which the protein is gelatin.

17. The composition of claim 14 in which the mixture has a pH below 7.

18. The composition of claim 14 in which the mixture has a pH above 7.

References Cited

UNITED STATES PATENTS

| | | | |
|---|---|---|---|
| 2,784,086 | 3/1957 | Henn | 96—66 X |
| 2,881,161 | 4/1959 | Kohler et al. | 260—209.6 |
| 3,082,122 | 3/1963 | Krasny | 260—209.6 X |
| 2,867,542 | 1/1959 | Keyser et al. | 96—84 |

OTHER REFERENCES

Fieser et al., Org. Chemistry, 3rd Edition, 1956, Reinhold Publishing Corp., New York, pages 860–861.

Mees, The Theory of the Photographic Process, 1954, The Macmillan Co., pages 79–84.

Hackh's Chemical Dictionary, 3rd Ed., 1944, The McGraw-Hill Book Company, Inc., New York, pages 689–690.

NORMAN G. TORCHIN, *Primary Examiner.*

A. D. RICCI, R. S. FICHTER, *Assistant Examiners.*